United States Patent [19]

Silver

[11] 4,159,066
[45] Jun. 26, 1979

[54] PACKAGE FOR DISPENSING A PLURALITY OF FLOWABLE MATERIALS

[76] Inventor: Jules Silver, Rte. 32, North Franklin, Conn. 06254

[21] Appl. No.: 792,106

[22] Filed: Apr. 29, 1977

[51] Int. Cl.² .............................................. B67D 5/56
[52] U.S. Cl. ..................................... 222/129; 222/320
[58] Field of Search ............... 222/129, 143, 319, 320, 222/543, 386; 220/17

[56] References Cited

U.S. PATENT DOCUMENTS

| 2,075,831 | 4/1937 | Schlumbohm | 222/319 X |
| 3,208,645 | 9/1965 | Rayner | 222/320 X |
| 3,283,964 | 11/1966 | Anderson | 222/543 X |

FOREIGN PATENT DOCUMENTS 71080   10/1952   Netherlands ............................. 222/320

*Primary Examiner*—Robert J. Spar
*Assistant Examiner*—Francis J. Bartuska
*Attorney, Agent, or Firm*—Murray & Whisenhunt

[57] ABSTRACT

There is provided a package for dispensing a plurality of flowable materials. A first container is composed of a closed bottom, associated side walls and an open top. A second container is composed of an apertured bottom, associated side walls and an open top. The second container can be slid into the first container and it will remain in essentially sliding contact with the inside of the side walls of the first container as it traverses the depth of the first container. A unitary conduit is in fluid-tight communication with the aperture of the bottom of the second container and a first dispensing orifice disposed near the top of the side walls of the second container. When the second container slides into the first container, flowable material in the first container is expressed through the dispensing orifice via the conduit. The second container has a detachable closure for the open top thereof with a second dispensing orifice therein so that a flowable material disposed in the second container may be dispensed from the second dispensing orifice by shaking or inverting the package.

12 Claims, 2 Drawing Figures

PACKAGE FOR DISPENSING A PLURALITY OF FLOWABLE MATERIALS

The present invention relates to a package for dispensing flowable materials where one of the flowable materials is expressed from the package by mechanical pressure. In a preferred embodiment, the invention relates to packages of the foregoing nature where the flowable material expressed by the mechanical pressure is a relatively viscous material and considerable mechanical pressure is required for expression of that viscous material from the package.

BACKGROUND OF THE INVENTION

There are many forms of packages for containing and dispensing flowable materials and the particular form has usually been chosen in regard to the predominant characteristic of the flowable material to be dispensed. For example, liquids of relatively low viscosity are usually packaged in screw or friction-type capped bottles. Moderately viscous liquids, such as hand lotions, are often packaged in a hand pump bottle or a flexible squeeze bottle in order to aid in dispensing the liquid from the package. When the geometrical shape of the dispensed stream is important, special shape forming dispensing means are provided, e.g. when a spray is desired an atomizing hand pump is often provided in the package.

Packages of the foregoing nature, and known modifications thereof, are not effective for dispensing flowable materials of high viscosity. For example, viscous hand lotion, face cream, toothpaste and like viscous suspensions and gels require greater pressure for satisfactory dispensing than can be conveniently achieved by conventional hand pumps and gravity.

Packages pressurized with chlorofluorohydrocarbons have been used for dispensing these more viscous flowable materials, but such pressurized packages do present problems, such as greater expense, possible explosion, leakage of the propellant and, as recently demonstrated, released propellant which can be dangerous to the environment. Thus, the art has sought ways to avoid the use of pressurized packages for dispensing viscous flowable materials. U.S. Pat. No. 3,208,645, issued to Rayner in 1965, discloses a package for dispensing flowable materials of a cream-like consistency wherein a lower open topped container has disposed therein an upper cylindrical plunger, the bottom of which engages essentially the entire cross-section of the container and thus is capable of exerting considerable pressure on the cream-like consistency contents in the lower container. The plunger is also open-topped but is provided with a cover (closure). Wing elements and friction portions on the side and underside of the cover frictionally engage the upper end of a dispensing channel, the lower end of which communicates with an orifice in the bottom of the plunger. Thus, a pathway for the flowable material is provided from the lower container through the channel and out of a dispensing orifice formed between the upper end of the channel and the wing elements and friction portions.

While the foregoing package arrangement provides advantages in the art, it does suffer from several decided disadvantages. First of all, the hollow plunger must have an overall volume essentially as great as the volume of the lower container. Thus, the shipping volume of the package is essentially twice the volume necessary to contain the flowable material. Also, since the wing elements and friction portions of the cover must closely mate with the upper end of the dispensing channel in order to make a completed passageway, accurate molding of the package and careful positioning of the cover on the plunger must be accomplished in order to insure a relatively fluid-tight passageway. As can be appreciated, any substantial deviation from that accuracy will allow the mating of the wing elements and frictional portions with the upper end of the channel to be less than fluid-tight and in operation of the package flowable material may pass between these mating surfaces and be lost into the interior of the plunger.

It would be, therefore, of considerable advantage in the art if the ratio of the volume of packaged flowable material to package volume could be increased beyond the essentially 0.5:1 of the above-discussed prior art package. It would be of even further advantage in the art if the problems associated with providing a passageway, as noted above, could be avoided, particularly in regard to the possibility of the packaged flowable material passing between the mating surfaces of the cover and channel and being lost into the interior of the plunger. It would be of even further advantage to the art to provide a package which is convenient for use in dispensing materials of the nature discussed above, but in addition thereto dispense yet a further flowable material. This would allow a dual package for materials commonly concurrently used, such as baby oil/baby powder, mustard/catsup, sugar/cream, suntan oil/suntan cream, and the like. Finally, it would be a decided advantage to the art to produce packages of the foregoing nature which do not require accurate assembly of parts for functional operation, and where all functional parts, particularly the passageway for the viscous flowable material, are integrally molded, e.g. from a plastic material or the like.

OBJECTS OF THE INVENTION

It is therefore an object of the invention to provide a package for dispensing a plurality of flowable materials, at least one of which may be, but not necessarily, a viscous flowable material. It is a further object of the invention to provide such a package where essentially the entire package volume may contain a corresponding volume of packaged materials. It is yet a further object of the invention to provide packages of the foregoing nature where all functional parts, particularly and passageway for the viscous flowable material, are integrally constructed and without frictional seams, mating surfaces and the like. It is also an object of the invention to provide such packages where a second non-viscous flowable material is disposed in a separate container and can be dispensed without disrupting the passageway for dispensing the viscous flowable material and where that second container can be opened and closed without the necessity of accurately positioning the closure. Finally, it is an object of the invention to provide such packages which can be conveniently molded, e.g. by plastic materials and the like, so that the package is essentially assembled as molded and no substantial further assembly of functional parts is required. Other objects will be apparent from the following detailed description and claims.

DETAILED DESCRIPTION OF THE INVENTION

Figure 1:
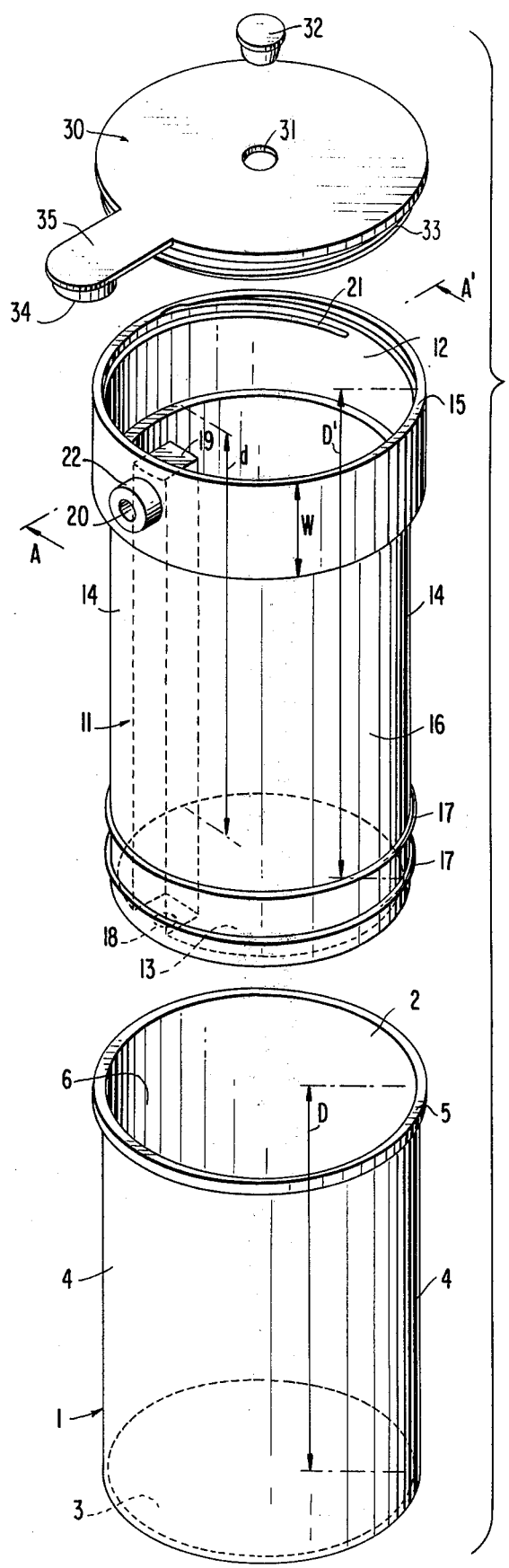
FIG. 1 is an exploded overall perspective view of a package according to the present invention.

As shown in FIG. 1, the package is composed of three major subsections. A first container 1 is designed to contain a first flowable material. That first container has an open top 2, a closed bottom 3 and upstanding side walls 4 which, of course, attach to bottom 3 to form the container. The side walls provide a depth D which determines the volume of the container, in conjunction with the bottom 3. The first container is conveniently provided with a lip 5 which may be used for attaching closures and the like and for reinforcing the open top. The inside surfaces 6 of the side walls are configured to be compatible in dimensions with the outside surface of a second container, described in detail in the following paragraph.

The second major subsection of the package is a second container 11 for containing a second flowable material. That container has an open top 12, a bottom 13 and upstanding side walls 14 which, of course, are attached to bottom 13 to form the container. The side walls provide a depth D' to the container. The container may also be provided with a lip 15 for attaching a closure or reinforcing the container opening. The container has an outside surface 16 which is dimensionally compatible with inside surface 6 of container 1, as briefly mentioned above. By arranging that inside surface 6 is dimensionally compatible with outside surface 16, container 11 can be slid into the open top 2 of container 1 and it will remain in essentially sliding contact with inside surface 6 of side walls 4 of container 1 as container 11 traverses essentially the entire depth D of container 1. By thus providing dimensionally compatible inside surface 6 and outside surface 16, container 11 functions as a piston when traversing depth D to apply pressure to flowable material disposed in container 1. To aid in the pressurization of the flowable material in container 1, it is preferred that container 11 be provided with one or more sealing rings 17 (preferably at least 2) to effect a better seal between outside surface 16 and inside surface 6. In this case, of course, it is necessary for the sealing rings to be dimensionally compatible with inside surface 6 to effect the sliding contact discussed above.

As can be also appreciated, depth D of container 1 and depth D' of container 11 must be compatible in dimensions so that container 11 is capable of traversing essentially the entire depth D to apply pressure to essentially all of the flowable material disposed in container 1. In the embodiment shown in FIG. 1, width W of lip 15 must be taken into account in determining those compatible depths and depth d will be essentially equal to depth D.

Pressure applied to flowable material in container 1 causes movement of that flowable material into aperture 18 of bottom 13 of container 11. Thus, as container 11 slides into and traverses container 1, the volume of flowable material which will pass into and through aperture 18 will essentially equal the differential volume decrease in container 1 as container 11 passes thereinto. That displaced flowable material will flow through unitary conduit 19, which is in fluid-tight communication with aperture 18 of the bottom of container 11 and also in fluid-tight communication with a first dispensing orifice 20, which is disposed in side walls 14 of container 11 near open top 12, i.e. so that the orifice does not pass into container 1 when the bottom of container 11 closely approaches or abuts the bottom of container 1. In the preferred embodiment, as shown in FIG. 1, the dispensing orifice 20 is actually disposed within the width W of lip 15, which insures that when container 11 fully traverses depth D, dispensing orifice 20 will still remain outside of container 1. The unitary conduit will be explained in more detail in connection with FIG. 2.

The third major subsection of the package is closure 30 which is dimensionally configured for closing open top 12 of container 11. Closure 30 has a second dispensing orifice 31 disposed therein. Orifice 31 is sealable by any convenient means such as friction fitted stopper 32 so that container 11 may be rendered fluid-tight when closure 30 and stopper 32 are in place.

Thus, it will be seen that the package provides the function that upon sliding container 11 into container 1 pressure is applied to the first flowable material in container 1 to force that flowable material through aperture 18 and unitary conduit 19 and out of the first dispensing nozzle 20 and upon either shaking or inverting the combined package, a second flowable material, disposed in container 11, is expelled out of the second dispensing orifice 31.

This package is conveniently made of a moldable material so that the unitary conduit 19 is integrally molded into the second container, as shown in FIG. 1. For purposes of the present specification and claims, the term "unitary conduit" is defined to mean that the conduit has solid, continuous and fluid-tight uninterrupted walls from aperture 18 to orifice 20. The conduit walls are monolithic, i.e. of one single section. The conduit is not composed of separate cooperating sections as the passageway described in the Rayner patent identified above.

Preferably, the unitary conduit is intergrally molded into container 11. In this connection, the term "integrally molded" means that the conduit and container 11 are formed in a single molding operation and as a monolithic molding. More preferably, a portion of side walls 14 of container 11 form a portion of the walls of conduit 19, as shown in FIG. 1.

Likewise, it is preferred that the first dispensing orifice 20 also be integrally molded with the conduit, and the terms "integrally molded" have the same definition as noted above. Also, similar, it is preferred that aperture 18 be integrally molded with the bottom 13 of container 11 and with conduit 19, the term "integrally molded" having the same definition as noted above. Thus, in the embodiment shown in FIG. 1, which is the preferred embodiment, a portion of side walls 14 of container 11, first dispensing orifice 20, aperture 18 and bottom 13 of container 11 are all integrally molded so that a unitary passage is provided from the aperture to the first dispensing nozzle.

It will thus be appreciated that with the foregoing arrangement of the conduit, closure 30 is detachable from the package without disrupting the unitary conduit, quite opposed to the arrangement of the above-identified Rayner patent. It will also be noted that with this arrangement, closure 30 is removably sealable to open top 12 of container 11 and, for certain applications, may be opened and closed for access into container 11 without the necessity of accurately repositioning closure 30 to effect a passageway from container 1 to dispensing orifice 20. This allows even greater utility of the package for certain applications. For example, container 1 may contain cream and container 11 may contain sugar. This could be a reusable package where additional cream is placed in container 1 by removing container 11 and additional sugar may be placed in container 11 by removing closure 30. Other reusable applications will be apparent.

The particular mode of resealably attaching closure 30 to container 11 is not critical and may be chosen as desired. Thus, a bayonet, a screw and a friction engagement may be used, as well as any of the other known arrangements in the art. FIG. 1 simply shows an example where cooperating threads 21 and 23 provide the required removable and resealable engagement.

Additionally, closure 30 may carry a removable and resealable first dispensing orifice closure 34 which is dimensionally configured to frictionally engage the outside surface 22 of dispensing orifice 20 so that the closure functions for removably and resealably closing that first dispensing orifice. Conveniently, that closure is carried by an appropriate attachment, such as bendable hinge 35, as shown in FIG. 1. If desired, instead of a stopper 32, closure 30 may carry a sealable second orifice closure, for removably and resealably closing the second orifice 31, which second closure is also attached to closure 30 by an appropriate attachment, such as a hinge, and the like (not shown in the drawings).

Figure 2:
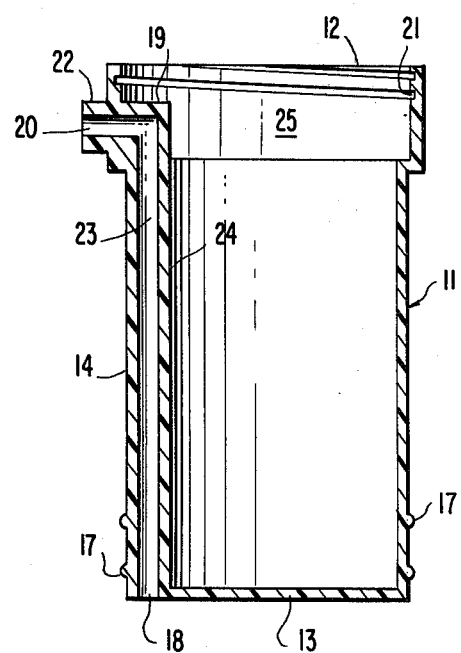
FIG. 2 is a cross-section taken along the lines AA of FIG. 1.

Turning now to FIG. 2, which is a cross-section of container 11 along the lines A-A', as can be move conveniently seen in FIG. 2, conduit 19 is a monolithic structure and extends from aperture 18 to first dispensing orifice 20 without interruption and as a fluid-tight single section conduit. In that arrangement, conduit 19 is formed by integrally molding so that a portion of wall 14 combines with opposed conduit walls 23 and connecting conduit walls 24 to provide the monolithic conduit. This avoids any problem of viscous flowable material being able to pass out of conduit 19 and into the interior 25 of container 11. Thus, the entire interior 25 of container 11 will stay totally separated from the viscous material passing through conduit 19 and that interior of container 11 is, therefore, available for containing and dispensing a second flowable material out of second dispensing orifice 31 of closure 30 (see FIG. 1).

As noted above, it is preferred that sealing rings 17 be provided. These sealing rings are conveniently also integrally molded as a monolithic structure, as shown in FIG. 2, but if desired, a sealing ring recess may be molded into container 11 and a separate sealing ring, such as an elastomer (natural and synthetic rubbers) and the like may be placed into the recess to effect sealing.

As can therefore be appreciated, the package of the present invention can contain a flowable material both in container 1 and in container 11 and therefore the ratio of the volume of packaged flowable material to package volume will closely approximate 1:1 instead of the 0.5:1 of the prior art package. This is of substantial commercial advantage in the art. Additionally, with the present arrangement, a plurality of flowable materials may be contained in a single package and this provides a very distinct advantage when the flowable materials are companion materials of the nature discussed above. In this connection, it should be clearly appreciated that the flowable materials need not be a liquid. The flowable materials may be granular solids, various liquids, a semi-solid, a suspension or slurry, paste and the like. It is only necessary that the flowable material disposed in container 11 be capable of dispensing from second dispensing orifice 31 without the requirement of pressure, i.e. a non-viscous flowable material. Any flowable material which requires pressure for dispensing will be disposed in container 1. Thus, examples of suitable flowable materials for container 11 are granular solids, e.g. salt, flavored sugar (to place an top of a dispensed dough), dusting powder, face powder, foot powder, non-viscous liquids, e.g. oils, colognes, mouthwash, and the like. Examples of flowable materials which require pressure are creams or lotions, e.g. heavy face and body creams or lotions, pastes, e.g. toothpaste, gels, e.g. hygienic and contraceptive gels, suspensions, e.g. dough and the like. The full advantage of the package, however, will be obtained only when the first and second flowable materials are companion materials, briefly indicated above. For purposes of the present specification, the term "companion materials" means flowable materials which are normally used in conjunction or in combination with each other. In addition to the examples noted above, are the further examples of toothpaste/mouthwash, shaving gel/after shave lotion, baby lotion or oil/baby powder, salad oil/vinegar, lubricating grease/lubricating oil, epoxy resin/epoxy curing agent, and the like.

Of course, for certain applications, obvious modifications of the specific embodiment shown in FIG. 1 will be required. For example, for certain applications, second dispensing orifice 31 is advantageously a dispensing spout so that relatively non-viscous liquids such as vinegar, etc. can be more conveniently dispensed. For that application, a cap, rather than stopper 32, would be provided. Similarly, first dispensing orifice 20 may have a shape-forming configuration so that the viscous flowable material expressed therefrom will be provided with an ornamental cross-sectional shape, which would be appropriate for the combination of prepared cake icing in container 1 and brightly colored granular sugar in container 11.

The material of construction for the package can be chosen from almost any desired material, but as noted above, a moldable material is preferred. While metal, of course, is a moldable material, for most packaging applications less expensive material is preferred. Glass meets the economic requirements, but is less convenient for molding than plastic and for this reason plastic materials are the preferred materials of construction. Any desired plastic materials having sufficient rigidity for effecting the required pressure on the flowable material in container 1 may be used. The plastic may be thermoplastic or thermosetting, but for obvious reasons, thermoplastic material is preferred. The thermoplastic material may be, inter alia, nylon, polystyrene, polyolefins (polyethylene, polypropylene, polypentene), ABS terpolymers, (poly)butyrates, acetates, formates, etc., and the like.

It will be appreciated, however, that the particular plastic must be sufficiently yieldable to provide effective sealing between container 1 and container 11, or the sealing rings must be so yieldable. This allows for minor variations in molding dimensions and yet provides compatible dimensions to effect sealing. For this purpose, the terms "compatible dimensions," and the like, used hereinbefore to describe the dimensional relationships of container 1 and container 11, mean that the geometric configuration of containers 1 and 11 have respective wall portions such that a substantially fluid-tight but slidable fit therebetween is provided. It should be appreciated that the referenced "respective wall portions" are herein intended to include the sealing ring or rings and that only a portion of the respective containers need provide the required respective wall portions, i.e. not all of the wall portions need to provide that relationship. Further, the geometric configurations need not be cylindrical and may be, for example, square, rectangular, polygonal, etc.

The package is produced by conventional injection molding machinery, dies, and molding techniques, all of which are well known in the art and for the sake of conciseness in this specification, will not be described.

Modifications of the above-described embodiments will be readily apparent to those skilled in the art and it is intended that these modifications be included within the spirit and scope of the annexed claims.

What is claimed is:

1. A package for containing and dispensing a plurality of flowable materials and made of a moldable material comprising in combination:
    (a) a first container for containing a first flowable material, said first container having an open top, a closed bottom and a depth provided by upstanding side walls;
    (b) a second container for containing a second flowable material, said second container having an open top, an apertured bottom and a depth provided by upstanding side walls, the dimensions of portions of the side walls of the second container being such that the second container can be slid into the open top of the first container and remain in essentially sliding contact with the inside surface of the side walls of the first container as the second container traverses essentially the entire depth of the first container;
    (c) a unitary conduit with solid, continuous and fluid-tight uninterrupted walls, said unitary conduit being in fluid-tight communication with the aperture at the bottom of the second container and a first dispensing orifice disposed in the side walls of the second container and near the open top thereof, said conduit being integrally molded into the second container with a portion of the side walls of the second container forming a portion of the walls of the conduit and the first dispensing orifice being integrally molded with the said conduit;
    (d) a closure for the open top of the second container having a second dispensing orifice disposed therein, said closure and said second orifice being sealable so that a material tight second container may be provided;

whereby upon sliding the second container into the first container pressure is applied to the first flowable material to force that flowable material through the said aperture and unitary conduit and out of said first dispensing orifice and upon shaking or inverting the said combination the second flowable material is expelled out the second dispensing orifice.

2. The package of claim 1 wherein the said aperture is integrally molded with the second container bottom and the said conduit.

3. The package of claim 2 wherein a portion of the sidewalls of the second container, the first dispensing orifice, the aperture and the second container bottom are integrally molded so that a unitary passage from the aperture to the first dispensing orifice is provided.

4. The package of claim 3 wherein the closure is detachable without disrupting said unitary conduit.

5. The package of claim 4 wherein the closure carries a removable and resealable first dispensing orifice closure for removably and resealably closing said first dispensing orifice.

6. The package of claim 5 wherein the closure carries a removable and resealable second orifice closure for removably and resealably closing said second orifice.

7. The package of claim 1, wherein the first container has disposed therein a viscous flowable material.

8. The package of claim 1, wherein the second container has disposed therein a non-viscous flowable material.

9. The package of claim 1, wherein the first container has disposed therein a member selected from the group consisting of a cream, lotion, paste, gel, or suspension.

10. The package of claim 1, wherein the second container has disposed therein a member selected from the group consisting of a granular solid and a non-viscous liquid.

11. The package of claim 1, wherein the first and second containers have disposed therein companion materials.

12. The package of claim 11 where the companion materials are selected from the group consisting of the pairs of toothpaste/mouthwash, shaving gel/after shave lotion, baby lotion or oil/baby powder, salad oil/vinegar, cake icing/granular sugar, or dough/flavored sugar.

* * * * *